United States Patent Office 3,431,222
Patented Mar. 4, 1969

3,431,222
HIGH TEMPERATURE RESISTANT POLYMERIC CYCLOSILAZANES
Walter Fink, Zurich, Switzerland, assignor to Monsanto Company, St. Louis, Mo., a corporation of Delaware
No Drawing. Continuation-in-part of application Ser. No. 496,702, Oct. 15, 1965, which is a continuation-in-part of application Ser. No. 399,814, Sept. 28, 1964. This application June 22, 1967, Ser. No. 647,944
U.S. Cl. 260—2       24 Claims
Int. Cl. C08g *31/30*

ABSTRACT OF THE DISCLOSURE

Novel polymers of repeating structural units

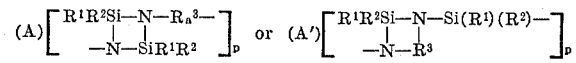

process by heating a compound

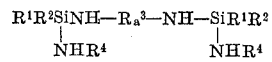

to split off amine and cyclize or by heating a compound

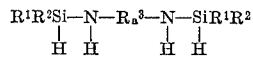

in the presence of a catalyst, e.g., an alkali metal or metal hydride, to split off hydrogen, the (A) compounds being formed when $R^3$ separates the nitrogen atoms by more than 3 aliphatic carbon atoms or meta or para spaced nitrogen atoms on an aromatic ring, otherwise the (A') compounds are formed.

---

This application is a continuation-in-part of copending application Ser. No. 496,702, filed Oct. 15, 1965, now abandoned which is a continuation-in-part of application Ser. No. 399,814, filed Sept. 28, 1964, now abandoned.

The present invention relates to a novel class of high temperature resistant polymers and a process of preparing same.

The novel polymers consist of repeating structural units of the general formula (A)

or in certain instances (A')

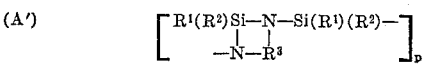

wherein preferably $R^1$ and $R^2$ are identical or different and represent fluorine atoms, hydrogen atoms or hydrocarbyls, i.e. groups containing hydrogen and carbon which can be saturated or unsaturated aliphatic or aromatic, and which can have halogen atoms, alkoxy groups, aroxy groups and silyl groups, i.e. —$SiR_3$ groups where R is hydrocarbyl or hydrocarbyl substituted with halogens, alkoxy or aroxy groups as substituents, or which form a heterocyclic group made by a chain of methylene groups joined through the silicon atom to which $R^1$ and $R^2$ are attached, $R^3$ is a hydrocarbylene group or hydrocarbylene ether group which, like the hydrocarbyl groups, can have halogen atoms, alkoxy groups, aroxy groups and silyl groups as substituents, $a$ is zero or 1 and $p$ represents the number of repeating units. All R, $R^1$, $R^2$, etc. groups can also contain other substituents than enumerated above as indicated by specifically named substituents below.

These compounds are obtained by decomposition of certain silazanes which can be generally expressed by the formula (B)

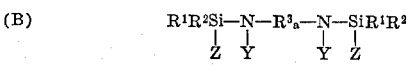

The starting compounds (B) suitable for carrying out the invention contain an amine radical Z cleavable in the reaction and which, together with a hydrogen atom Y, is released during the cyclization and polymerization process. $R^1$ to $R^3$ and $a$ are defined as before. The preferred amine radicals Z are derived from primary amines which are easily volatile at the reaction temperature. Examples are methylamine, ethylamine, n-propylamine, ispropylamine, n-butylamine, iso-butylamine, sec-butylamine, tert-butylamine, methoxymethylamine and methoxyethylamine. However, the amine radicals can also be derived from cycloaliphatic, araliphatic and aromatic amines, so far as these are volatile at the reaction temperature. The choice of the appropriate amine may also be directed by the boiling point of the derived diaminosilane and by the destiny of the amine when it is split off again. The amine radicals derived from secondary amines are less preferred. It was found that the compounds having tertiary amine groups in most of the cases yield only half the amount of the desired polymeric cyclodisilazanes since a detrimental rearrangement occurs.

Thus, the preferred starting compounds are more specifically represented by the formula (C)   $R^4HN—Si(R^1R^2)—$
            $NH-R^3_a-NH-Si(R^1R^2)-NHR^4$ wherein $R^1$ to $R^3$ and $a$ are defined as above and $NHR^4$ identifies a radical of a primary amine as mentioned above and which is released in the reaction.

The formation of the polymeric cyclodisilazanes probably proceeds in all cases via an unstable, intermediate bis(silylimide) which quickly polymerizes under formation of very stable four-membered rings. This reaction can be schematized as follows:

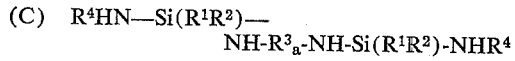

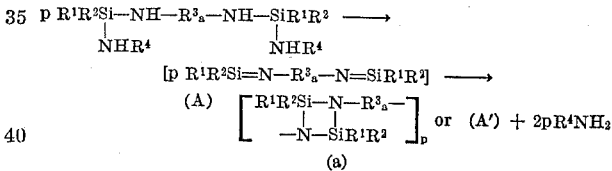

(a)

The starting compounds as generalized by the Formula B and more closely specified by the Formula C and which here further are denoted N,N'-bis(aminosilyl) amines, have not been known up to now. They are easily obtained by transamination of diaminosilanes which are well known compounds obeying to the formula (D)       $R^4HN—Si(R^1R^2)—NHR^4$ wherein $R^1$ to $R^4$ are defined as before, with a diamine of the formula (E)       

wherein $R^3$ and $a$ are defined as before.

Numerous diaminosilanes showing the Formula D, or dichlorosilanes from which the former can be prepared, are known in the prior art. Examples of $R^1$ and $R^2$ which are also found in the polymers of invention as becomes evident on considering the equation (a) are: hydrogen, fluorine, alkenyls, alkyls and alkynyls such as methyl, ethyl, vinyl, ethynyl, n-propyl, isopropyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic radicals having up to 24 carbon atoms such as undecenyl, dodecyl, myristyl, oleyl, tetracosyl; cycloalkyls, cycloalkenyls and cycloalkynyls such as cyclopentyl, cyclopenteyl, cyclopentadienyl, cyclohexyl, cyclohexenyl, cyclohexynyl, cyclohexadienyl and larger alicyclic radicals having up to 12 carbon atoms such as cyclododecyl, cyclooctyl, cyclooctatrienyl, cyclododecatrienyl, bicyclohexyl; aralkyls, aralkenyls and aralkynyls, such as benzyl, cuminyl, phenyl-ethyl, styryl, phenylethynyl, phenylpropyl, 3-phenylallyl, 2-phenylallyl, cinnamyl, 1-phenylpropynyl, diphenylmethyl, triphenylmethyl, α-naphthylmethyl, β-naphthylmethyl, α-naphthylethyl, β-naphthylethyl, α-naphthylethenyl, β-naphthylethenyl, α-naphthylethynyl, β-naphthylethynyl; alkaryls, alkenylaryls and alkynylaryls such as tolyl, xylyl, mesityl, duryl, ethylphenyl, cumyl, methyl, vinylphenyl, ethynylphenyl, propargylphenyl, propynylphenyl, tert-butylphenyl, 1-vinylnaphthyl, 2-vinylnaphthyl, 1-ethynylnaphthyl, 2-ethynylnaphthyl; aryls such as phenyl, o-biphenylyl, m-biphenylyl, p-biphenylyl, p-terphenylyl, m-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl; and heterocyclic radicals such as pyrryl, furyl, benzofuryl, thienyl, pyrrolinyl, pyrazolyl, pyrazolinyl, imidazolyl, thiazolyl, oxazolyl, isooxazolyl, pyrazinyl, pyrimidyl, pyridazinyl, pyridyl, pyranyl, thiopyranyl, piperidyl, morpholinyl, thiazinyl, triazinyl, quinolyl, quinazolyl, quinoxalyl, indolyl, carbazolyl. If an —NH— group is present it is preferably substituted like in N-methylpyrryl, N-trimethylsilylimidazolyl, etc.

It was found that the enumerated hydrocarbon radicals as well as the heterocyclic radicals can possess substituents and these substituents will not hinder the success of the reaction. Examples of possible substituents are Cl, Br, I, F, —$OR^6$, —$SR^6$, —$COR^4$, —$CSR^4$, —$COOR^6$, —$OCOR^4$, —$CONR^5R^6$, —$N(R^6)COR^4$, —$N(R^6)COOR^4$, —$N(R^6)CONR^4R^5$, —$NR^5R^6$, —$N=NR^4$, =$NR^6$, —$N=CR^4R^5$, —$CN$, —$NO_2$, —$SOR^4$, —$SO_2R^4$, —$SO_2OR^6$, —$SO_2NR^5R^6$, —$N(R^6)SO_2R^4$, —$N(R^6)SO_3R^6$, wherein the symbols have the same significance as before; furthermore, Si, B and P-containing radicals as specified above for $R^1$ and $R^2$.

Examples of some simple representatives of the large class of halogenated hydrocarbyls are chloromethyl, dichloromethyl, trichloromethyl, bromomethyl, dibromomethyl, tribromomethyl, fluoromethyl, difluoromethyl, trifluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2-dichlorovinyl, trichlorovinyl, trifluorovinyl, chloroethynyl, fluoroethynyl, chlorophenyl, dichlorophenyl, trichlorophenyl, bromophenyl, fluorophenyl, difluorophenyl, trifluorophenyl, pentafluorophenyl.

Examples of some hydrocarbyloxy substituents showing the formula $R^6O$— are methoxy, ethoxy, dimethylaminoethoxy, vinyloxy, n-propoxy, iso-propoxy, bis(trimethylsilyl)-amino-iso-propoxy, 1 - propeneoxy, 2 - propeneoxy, iso-propeneoxy, n-butoxy, iso-butoxy, sec-butoxy, tert-butoxy, crotoxy, n-amoxy, iso-amoxy, n-octanoxy, 10-undecyleneoxy, lauroxy, stearoxy, phenylmethoxy, styryloxy, phenylethynyloxy, p-allylphenoxy, phenoxy, toloxy, xyloxy, 3-biphenylyloxy, 1-naphthoxy, 2-naphthoxy, m-diphenylaminophenoxy, asaryloxy, including the thio analogues having sulfur in the place of oxygen and showing the formula $R^6S$—. Especially useful substituents possess several ether groupings branched or in sequence such as methoxymethyleneoxy, methoxyethyleneoxy, ethoxyethyleneoxy, tert-butoxy-tert-butyleneoxy, veratroxy, anisoxy, phenetoxy, 3,4-dimethoxyphenenyloxy, 3-phenoxyphenyleneoxy, 3-phenoxy-4-methoxyphenenyloxy, 3,4-diphenoxyphenenyloxy, polymethyleneoxy of the formula $R^9OCH_2(OCH_2)_bO$—, wherein $b$ is defined as before and $R^9$ is an etherifying or esterifying terminal radical as usual in polyoxymethylene compounds, the parent substituents having ethylene or propylene in the place of methylene. $R^9$ normally has not more than 24 carbon atoms. The cited hydrocarbyloxy radicals can also be directly attached to the silicon atoms as provided under the definition of $R^1$ and $R^2$. Other poly(alkylene ether) radicals possess the formula $$R^9OCH_2CH_2(OCH_2CH_2)_b—$$

or $R^9OCH_2CH_2CH_2(OCH_2CH_2CH_2)_b$—, wherein $R^9$ and $b$ again are defined as before. They are obtained by action of ethylene oxide or propylene oxide on hydroxyethyl or hydroxypropyl attached to silicon.

A free hydroxyl or mercapto group can be present as a substituent in the polymers. The simplest representatives of the class are hydroxyethyl and mercaptoethyl. Cross-linking may occur during the polymerization. The reaction may be carried out using the sodium, potassium or lithium salt. The HO and HS groups can be restored by ion exchange.

Examples of some acyl substituents showing the formula

are acetyl, n-propionyl, acrylyl, crotonyl, propiolyl, n-butyryl, iso-butyryl, amoyl, pivalyl, enanthyl, caprylyl, lauroyl, myristoyl, oleolyl, stearoyl, phenylacetyl, diphenylacetyl, cinnamoyl, benzoyl, naphthoyl, cumoyl, 4-biphenylylcarbonyl, anisoyl, phenetoyl, veratroyl, 2,3,4,-2,4,5- and 3,4,5-trimethoxybenzoyl, p-diphenylaminobenzoyl, trimethylsilylanthranoyl, methoxyacetyl, di methylaminoacetyl, cyanoacetyl, trimethylsilylaminoacetyl, bis-(trimethylsilyl)aminoacetyl, trimethylsiloxyacetyl, trichloroacetyl, trifluoroacetyl, 2-furoyl, 3-furoyl, pyrroyl, including the thio analogues showing the formula

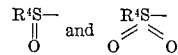

These radicals forming a ketone or thioketone group may be converted by the primary amine released in the reaction into the corresponding radical of a Schiff's base.

Examples of sulfinyl and sulfonyl substituents are those having a SO or $SO_2$ group in the place of the CO group shown in the formula above and thus corresponding to the formulas

These groups as well as the carbonyl can repeat several times in a same substituent.

Examples of some carboxy substituents showing the formula

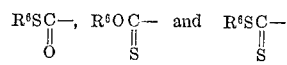

are the free carboxy group and the ester derivatives such as carbomethoxy, carbethoxy, carbovinyloxy, carbo-n-propoxy, carbo-2-propeneoxy, carbo-iso-propeneoxy, carboctoxy, carbundecyleneoxy, carboctadecoxy, carbophenoxy, including the thio analogues showing the formulas

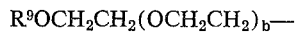

The intermediates containing a free carboxy or other acid group are brought to reaction in the form of a sodium, potassium or primary amine salt using in the latter case the same amine which is attached to the silicon and which will be split off during the reaction. The free carboxylic groups are restored in the polymer by ion exchange which is achieved by treatment with dilute acid.

Examples of parent sulfo substituents are those having a $SO_2$ group in the place of the CO group shown in the formula above and thus corresponding to the formula

The cited ester radicals can be also attached through a nitrogen atom and so represent a urethan radical showing the formula

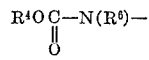

including the analogous radicals of thiourethans. During the polymerization the urethan group may be converted into a urea group.

Examples of the parent sulfamido substituents are those having a $SO_2$ group in the place of the CO group shown in the formula above. Contrarily to the carboxylic derivatives, the free acid exists and hence the radicals can be expressed by the formula $$R^6OS-N(R^6)-$$
$$\underset{O}{\overset{O}{\diagup\diagdown}}$$

Examples of a further class of ester substituents showing the formula

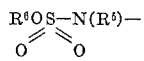

are acetoxy, acryloyloxy, n-propionyloxy, crotonyloxy, propiolyloxy, tetrolyloxy, n-butyryloxy, iso-butyryloxy, valeryloxy, caproyloxy, caprylyloxy, pelargonyloxy, capryloxy, lauroyloxy, palmitoyloxy, cumoyloxy, phenylacetoxy, phenylacryloyloxy, benzoxy, including the thio analogues showing the formulas

The radicals of monoesters of dicarboxylic acids, for example, the ethylester of oxalic acid, malonic acid, succinic acid, maleic acid, fumaric acid, adipic acid, phthalic acid, etc. can also be present as substituents. In the course of polymerization the acid portion can be cleaved and form an amide with the primary amine also cleaved in the reaction. The generated alcohol portion still attached to the silicon may incite cross-linking of the polymer. If the components are appropriately selected, the amide which is formed can act as a plasticizer or it can be distilled off.

Examples of a further class of ester substituents are those having a $SO_2$ group in the place of the CO group shown in the formula above and thus corresponding to the formula

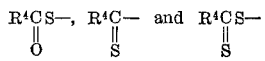

Examples of some carbamyl substituents showing the formula

are the unsubstituted carbamyl group, the alkali salts thereof, methylcarbamyl, ethylcarbamyl, allylcarbamyl, n-propylcarbamyl, iso-propylcarbamyl, iso-propenylcarbamyl, n-butylcarbamyl, sec-butyl carbamyl, 3-n-butenylcarbamyl, myristylcarbamyl, cyclohexylcarbamyl, phenylcarbamyl, trimethylsilylcarbamyl, dimethyl-phenylsilylcarbamyl, triphenylsilylcarbamyl, including the similarly disubstituted carbamyls. In general, a carbamyl derived from an identical amine as is directly attached to the silicon and will be released in the reaction, or from an amine unable to undergo transamination (i.e. sterically hindered amine or hardly volatile or non-volatile amine) is preferred.

Examples of parent sulfamyl substituents are those having a $SO_2$ group in the place of the CO group shown in the formula above and thus corresponding to the formula

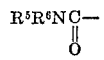

Examples of some amino substituents showing the formula $R^5R^6N-$ are methylamino, ethylamino, n-propylamino, isopropylamino, allylamino, n-butylamino, iso-butylamino, sec-butylamino, tert-butylamino, 3-butenyl- amino, 2-butenylamino, n-amylamino, iso-octylamino, anilino, dodecylamino, cyclohexylamino, cyclohexenylamino, benzylamino, toluidino, p-phenylanilino, cumidino, anisidino, m-methoxyanilino, p-anisylanilino, m-trifluoromethylanilino, N-diphenylbenzidino, pyrrolino, pyrrolidino, pyrazolino, piperidino, morpholino, thiazino, N-trimethylsilylpiperazino, tetrahydroquinolino, decahydroquinolino. If the primary amino group $H_2N-$ or a secondary amino group $R^4HN-$ is present, transamination may occur and cross-linking in the polymer will result. The transamination can be avoided with tertiary amino groups $R^4_2N-$ such as dimethylamino, diethylamino, dipropylamino, dibutylamino and so on, and heterocyclic amino groups specified above.

The amino groups can also be attached directly to the silicon as provided under the definition of $R^1$ and $R^2$. In such cases the starting material would be a triaminosilane or a tetraaminosilane. If cross-linking in the polymer is not desired, these amino groups (i.e. the third and, if any, the fourth amino group) preferably are tertiary ones.

Examples of some amido substituents showing the formula

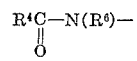

are acetamido, chloroacetamido, trifluoroacetamido, benzamido, cyanobenzamido, propionylamide, n-butyrylamido, valerylamido, palmitoylamido, tetracosanoylamido, naphthoylamido, including the parent imido groups, such as phthalimido, pyromellitimido. During the polymerization the acid portion can be split off and form together with the primary amine which is also released in the reaction, an amide. Simultaneously, a primary amino group attached through a hydrocarbon radical to the silicon is restored and will incite cross-linking of the polymer. The amide formed can be distilled off or remain in the polymer and act as a plasticizer, if the components have been appropriately selected. Thus, a possibly formed acetamide would distill off, whereas amides derived from higher molecular fatty acids could act as plasticizers.

Examples of sulfoamido substituents are those having a $SO_2$ group in the place of the CO group shown in the formula above and thus corresponding to the formula

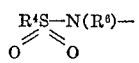

Examples of some azo substituents showing the formula $R^4N=N-$, are methylazo, ethylazo, n-butylazo, iso-butylazo, tert-butylazo, phenylazo, N-phenyl-phenylene-bis-azo.

Examples of some azino substituents showing the formula $R^4R^5C=N-N=$ are acetaldehyde azino, acetone azino, hexafluoroacetone azino, benzaldehyde azino, acetophenone azino, 2,4'-dichloroacetophenone azino, benzophenone azino, 4,4'-bis(n-trimethylsilyl-methylamino)-benzophenone azino.

Examples of some alkylideneamino substituents showing the formula $R^4R^5C=N-$ are methyleneamino, ethylideneamino, 2-trifluoroethylideneamino, vinylideneamino, n-propylideneamino, 1-ethylbutylideneamino, 3-butenylideneamino, benzylideneamino, alpha-methylbenzylideneamino, alpha-phenylbenzylideneamino, cinnamylideneamino.

Examples of some imino substituents showing the formula $R^6N=$ are the free imino group, the alkali salts thereof, methylimino, iso-butylimino, sec-butylimino, allylimino, cycloheptylimino, phenylethylimino, anisylimino, p-dimethylaminophenylenimino, pentafluorophenylimino. The unsubstituted or substituted imino group attached to hydrocarbon radicals as provided under the definition of $R^1$ and $R^2$ form quite generally a radical of a Schiff's base. Such substituents can be also formed during the polymerization by conversion of aldehyde radicals or ketone radicals by the primary amine which is evolved in the reaction.

Examples of some simplest representatives of the large class of cyanated and nitrated hydrocarbyls are 2-cyanoethyl, 2-nitroethyl, 2-cyano-n-propyl, 3-cyano-n-propyl, 2,4-dicyano-n-butyl. Instead of ethyl, n-propyl or n-butyl, other hydrocarbyls, such as has been mentioned for $R^1$ and $R^2$ can be present.

Examples of some silyl substituents showing the formula $R^7_3Si$— which are more closely specified by the formula $R^4_3Si$— are trimethylsilyl, tris(trifluoromethyl) silyl and other trihydrocarbylsilyls containing identical or different, saturated or unsaturated alkyls, cycloalkyls, aralkyls, alkaryls or aryls such as formerly specified for $R^1$ and $R^2$, including silyls in which Si is a constituent of a heterocyclic ring like in silacyclopentane, silacyclopentene, silacyclohexane, silacyclohexene, silacyclohexadiene, etc.; or which are more closely specified by the formulas $F_3Si$—, $F_2R^4Si$— and $F(R^4)_2Si$— are trifluorosilyl, methyldifluorosilyl, dimethyl-fluorosilyl, phenyl-difluorosilyl, diphenyl-fluorosilyl and other hydrocarbyl-difluorosilyls or dihydrocarbyl-fluorosilyls having hydrocarbyl radicals such as mentioned above; or which are more closely specified by the formulas $(R^4O)_3Si$—, $F_2(R^4O)Si$—, $F(R^4O)_2Si$ are trimethoxysilyl, difluoromethoxysilyl, fluoro-dimethoxysilyl, triphenoxysilyl, difluorophenoxysilyl, fluoro-diphenoxysilyl and other trihydrocarbyloxysilyls, difluorohydrocarbyloxysilyls and fluoro-dihydrocarbyloxysilyls containing identical or different, saturated or unsaturated alkoxyls, cycloalkoxyls, aralkoxyls, alkaroxyls or aroxyls such as formerly specified for $R^4O$—; or which are more closely specified by the formulas $R^4(R^4O)_2Si$— and $R^4_2(R^4O)Si$— are methyl-dimethoxysilyl, dimethyl-methoxysilyl and analogues having a combination of other organic radicals, such as enumerated before.

The silyl substituents can be attached through oxygen and so show the formula $R^7_3SiO$—. Some simple representatives are trifluorosiloxy, trimethylsiloxy, trimethoxysiloxy, triphenylsiloxy, triphenoxysiloxy, dimethyl-methoxysiloxy, methyl - dimethoxysiloxy, diphenyl - phenoxysiloxy, phenyl-diphenoxysiloxy, dimethyl-phenoxysiloxy, phenyl-dimethoxysiloxy and analogues having a combination of other organic radicals such as enumerated before.

The silyl substituents can also be attached through nitrogen and so show the formulas $R^7_3SiHN$—, $R^7_3Si(R^4)N$— and $(R^7_3Si)_2N$—. Some simple representatives are trifluorosilylamino, trifluorosilyl - methylamino, bis-(trifluorosilyl) - amino, trimethylsilylamino, trimethylsilyl-methylamino, bis-(trimethylsilyl)amino, trimethoxysilylamino, trimethoxysilyl - methylamino, bis - trimethoxysilyl)-amino, triphenylsilylamino, methyl-diphenylsilylmethylamino, bis-(dimethyl-phenylsilyl)-amino, and analogues having a combination of other organic radicals such as specified for $R^1$ and $R^2$ and for $R^4O$, and such as provided under the definition of $R^7$.

Examples of boryl substituents are those having boron in the place of the silicon shown in the formulas above and being valency satisfyingly substituted. They can be expressed by the formulas $R^8B$—, $R^8_2BO$—, $R^8_2BHN$—, $R^8_2B(R^4)N$— and $(R^8_2B)_2N$—.

Examples of phosphorus-containing substituents are those having phosphorus in the place of the silicon shown in the formulas above and being valency satisfyingly substituted. They can be expressed by the formulas $R^9_2P$—, $R^9_2PO$—, $R^9_2PHN$—, $R^9_2P(R^4)N$—, $(R^9_2P)_2N$— including the oxidized and sulfidized, quadruply connected analogues.

In general, all the cited substituents are attached to lower alkyls, alkenyls or alkynyls having 1 to 5 carbon atoms or to phenyl. However, they may also be present on higher aliphatic radicals, or cycloaliphatic radicals, araliphatic radicals and polynuclear aromatic radicals. It may be noted that in the alicyclic and aromatic radicals the enumerated substituents can be in the ortho, meta or para position with respect to the position these rings are attached, as well as with respect to themselves, if two or more substituents are present.

The substituents containing Si, B or P can be attached directly to the silicon as is provided under the definition of $R^1$ and $R^2$. In such instances, one or more of the radicals $R^7$, $R^8$ or $R^9$ in the formulas above can be replaced by a same group. The silyl groups are generally preferred. The substituents which contain Si-Si or SiO-Si sequences are especially valuable. They can be expressed by the formulas $R^4_3Si$—$Si(R^4)_2$—, $(R^4O)_3Si$—$Si(R^4O)_2$—

$R^4_3Si$—$NH$—$Si(R^4)_2$—, $(R^4O)_3Si$—$NH$—$Si(R^4O)_2$—, $R^4_3Si$—$N(SiR^4_3)$—$Si(R^4)_2$—,

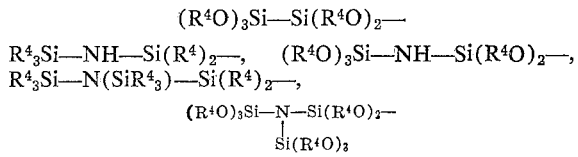

$R^4_3SiO(R^4_2SiO)_c$— and $(R^4O)_3SiO(R^4O_2SiO)_c$— wherein $R^4$ is defined as before and $c$ is an integer up to 10. These groups can be attached to the silicon of the four-membered ring through oxygen or nitrogen as has been explained above for the simple silyl groups. Illustrative examples of some simple representatives are pentamethyldisilanyl, 1-trimethylsilyl-tetramethyldisilanyl, 1-bis - (trimethylsilyl) - trimethyldisilanyl, pentamethoxydisilanyl, 1-trimethoxysilyl-tetramethoxysilyldisilanyl, 1-bis - (trimethoxysilyl)-trimethoxydisilanyl, pentamethyldisilanoxy, pentamethyldisiloxanoxy, pentamethyldisilanylamino, pentamethyldisilazanylamino, pentamethyldisilazanyl, pentamethyldisilazanoxy, etc.

When the substituents containing Si, B or P are attached to the silicon of the four-membered ring via a hydrocarbon radical, this radical is preferably the divalent —$R^3$— of which the most important species are methylene, ethylene, phenylmethylene, diphenylmethylene, phenylene, durylene, biphenylylene, methylene ether, ethylene ether, dimethyleneoxymethylene, 1,2 - dimethyleneoxyethylene, diphenylene ether, 1,4-dimethyleneoxyphenylene, 1,3-dimethyleneoxyphenylene, 1,4-diphenyleneoxyphenylene, 1,3 diphenyleneoxyphenylene.

The starting diaminosilanes which can be subected to the transamination are numerous. Some simple representatives are bis(methylamino)-dimethylsilane, bis(methylamino) - diphenylsilane, bis(methylamino)-pentamethylenesilane, bis(methylamino)-heptamethylenesilane, bis (ethylamino)-difluorosilane. Regarding the amine radical which is released in the reaction, a low boiling, cheap amine which can be recovered and used again will be selected. This selection, however, is also directed by the boiling point of the intermediate diaminosilanes, since the reaction time can be considerably shortened at higher starting temperatures. As a rule, somewhat higher molecular radicals on the nitrogen atoms will be preferred when those on the silicon atoms are lower molecular.

The transamination of diaminosilanes with mono-functional amines has been reported from the literature. Bis (benzylamino) - dimethylsilane, bis(anilino) - diphenylsilane and bis(vinyloxy - 2 - ethylamino)-dimethylsilane representing some symmetric diaminosilanes are known to have been prepared by transamination. The transamination is carried out in similar manner with difunctional amines, i.e. diamines or compounds containing two $NH_2$ groups, using a molar proportion of 2:1 of the reactants:

$2R^4HN$—$Si(R^1R^2)$—$NHR^4 + H_2N$—$R^3_a$—
$NH_2 \rightarrow R^4HN$—$Si(R^1R^2)$—$NH$
—$R^3_a$—$NH$—$Si(R^1R^2)$—$NHR^4 + 2R^4NH_2$ In the transamination well known facts such as the strength of the Si—N bond, which is affected by the substituents on the silicon and nitrogen, as well as steric occurrences have to be respected.

Almost any available aliphatic, cycloaliphatic, araliphatic, aromatic and heterocyclic diamine is suitable for the preparation of the starting products or intermediary products respectively. Some qualified representatives are hydrazine, guanidine, urea, ethylene diamine, 1,3-diaminopropane, 1,2-diaminopropane, 1,4-diaminobutane, 1,2-diaminobutane, 2,3-diaminobutane, 1,3-diaminobutane, 1,5-diaminopentane, hexamethylenediamine, 1,2-diaminocyclobutane, 1,2-, 1,3-, 1,4-diaminocyclohexane, 4,4'-diaminobicyclohexane, 1,6 - diaminocyclododecane, o - aminobenzylamine, 4,4'-diaminodiphenylmethane, 2,2'-diaminobibenzyl, diaminobenzenes, beta,beta-diaminodiethylbenzenes, 2,2'-, 3,3'-, 3,4'-, 4,4'-diaminodiphenyl, 2,2'-diaminotolane, 2,2'-, 2,4-, 4,4'-diaminostilbene, 1,2-, 1,4-, 1,5-, 1,6-, 1,8-diaminonaphthalene, diaminotetralines, diaminodecalins, 3,3'- diaminobimesityl, 9,10-diaminoanthracene, 10,10'-diaminobianthryl, 9,9'-diaminobinaphthyl, 2,6-diaminopyrazine, 2,4-, 4,5-, 2,6-, 4,6-diaminopyrimidine, 3,7-diaminophenothiazine, 2,4-, 2,5-diaminothiazoles, 2,6-diaminopyridine, 1,4 - diaminopiperazine, 2,4 - diaminotriazine-1,3,5,5,6-diaminoindazole, diaminocarbazoles, 2,4-, 4,7-, 4,8-diaminoquinazoline.

Besides these simple primary diamines are also considered amino compounds having on their hydrocarbyl one or several substituents such as halogen (e.g. diaminochlorobenzenes, -bromobenzenes, -fluorobenzenes, 2,4-diamino-6-chloropyrimidine, 1 - diamino-2-trifluoroethane), nitro groups (e.g. diamino-nitrobenzenes, 4,4'-diamino-2''-nitrotriphenylmethane), cyano groups (e.g. diaminobenzonitriles), carbonyl groups (e.g. 1,3-diaminoacetone, 2,2'-, 4,4'-diaminobenzephenone, 4,4'-diaminobenzils, 2,5'-, 2,6-diamino - p - benzoquinone, o - benzoquinone), hydroxyl groups (e.g. 2,4-diaminophenol, 6,4-diamino-3-hydroxydiphenyl, 3,4-diamino-1-naphthol, 4,4' - diaminobenzoin), mercapto groups (e.g. 2,4-diamino-1,3,5-triazine-6-thiol), ether groups (e.g. aminoanisidines, 4,4'-diamino-3,3'-dimethoxybiphenyl, 3,8-diaminodiphenylene oxide, 4,5-diamino-2,6-dimethoxypyrimidine), 3,3' - diaminoperfluorobicyclohexyl oxide, thioether groups (e.g. 2,2'-, 4,4'-diaminodiphenylsulfide, 2,2'-, 4,4'-diaminodiphenyldisulfide, 2,2' - diaminodiethylsulfide, 4,5-diamino-2,6-dimethylmercaptopyrimidine), sulfonyl groups (e.g. 4,4'-diaminodiphenylsulfone), 2,2' - diaminodiethylsulfone, carboxylic groups (e.g. diaminobenzoic acid, 4,4'-diaminodiphenic acid, 4,4'-diaminodiphenyl-3-carboxylic acid, beta,beta'-diaminoadipic acid, alpha,beta-, alpha-gamma-diaminobutyric acid), sulfo groups (e.g. 4,4'-diaminostilbene-2,2'-disulfonic acid), including the ester and amides of the acids, azo groups (e.g. 2,2'-, 2,4-, 3,3'-, 4,4'-diaminoazobenzene, 4,4'-diaminoazodiphenyl, 4,4'-diaminobisazobenzene).

The reactants having acid groups are brought to reaction in the form of an alkali salt. The free acid may be restored in the endproducts by treatment with dilute acids.

The selection of the diamines which become the ring linking portion of the polymeric cyclodisilazanes conforms with the desired properties such as stability, thermoplasticity, curability, solubility, etc. of the polymers.

The intermediary compound (B) can be isolated. However, it is expedient to renounce the isolation and to carry out the subsequent pyrolytic decomposition into the polymeric cyclodisilazanes in the same batch.

Whereas the transamination can be achieved at relatively low temperature, the formation of the polymeric cyclodisilazanes needs higher temperatures. The convenient temperature is different from case to case and lies, as a rule, at least at the boiling point, if any, of the simple starting diaminosilane used in the reaction, or somewhat above this temperature. In the course of reaction at first transamination to the higher boiling N,N'-bis-(aminosilyl)-diamine occurs, allowing a gradual increase of the reaction temperature. The ease with which the transamination and the final cyclization and polymerization proceeds, depends on the amine radicals, as well as on the organic radicals present on the silicon. The more volatile and/or basic the released amine is, and/or the more electron-furnishing the organic radical on the silicon are, the faster this reaction, as a rule, proceeds.

The amine which is split off in the transamination and also in the final step, and which is generally lower boiling than the diamine employed, has to be removed continuously from the reaction mixture, since it is supposed that the novel reaction is an equilibrium reaction. The removal of the amine may be accomplished in simple manner by continuous distillation, possibly under reduced pressure. Other known methods of elimination or inactivation of the released amine, of course, will not be excluded.

The upper temperature limit of the reaction of invention is defined by the decomposition point of the polymeric cyclodisilazanes to be prepared. This decomposition point is relatively high in most the cases and lies throughout above 400° C.

The course of reaction can be followed up quantitatively by determination of the amine quantity which is evolved. In all cases investigated till now the conversion lies between about 90 and 100%.

Thus, the novel polymeric cyclodisilazanes are obtained by a simple heating of the reactants at an elevated temperature until no more substantial quantity of the primary amine is released.

It has been found that the polymeric cyclodisilazanes can also be obtained from compounds according to the Formula (B) wherein Y and Z signify hydrogen atoms. In this process of invention there can be used as starting compounds N,N'-disilyldiamines of the formula (F) 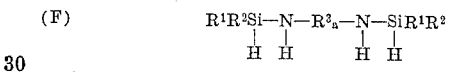

which are easily converted upon treatment with elemental alkali metal into the corresponding polymeric cyclodisilazanes at relatively low temperatures, i.e. room temperature till about 150° C. When the starting compound (F) possesses a sufficient acidity, depending on the circumstances, also an alkaline earth metal or aluminum can be used for this purpose.

It is assumed that at first the corresponding salt, e.g. potassium salt —NK— is intermediately formed with the imino groups —NH— present, whereafter the reaction proceeds instantaneously further according to the scheme:

$[pR^1R^2HSi-NK-R^3{}_a-NK-SiHR^1R^2] \longrightarrow$ $\quad [pR^1R^2Si=N-R^3{}_a-N=SiR^1R^2] \longrightarrow$ (A) 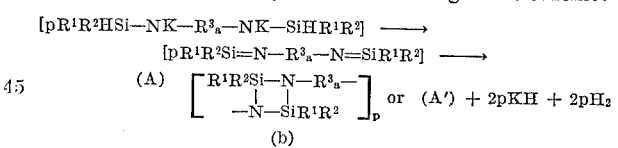 or (A') + 2pKH + 2pH$_2$ (b)

It has been found further that instead of the alkali metals mentioned, also their hydrides can be used. A catalytic amount of an alkali metal, or hydride thereof respectively, is sufficient to complete the reaction because the corresponding hydrides are always regenerated in the reaction formulated above.

The N,N'-bis(silyl)diamines (F) can be obtained by reaction of, for example, chlorosilanes $R^1R^2HSiCl$ with diamines (E). On further investigating the reaction of invention it has been found that instead of an N,N'-bis(silyl)diamine (F) a mixture of a silane of the formula (G) $\quad\quad\quad R^1R^2SiH_2$ wherein $R^1$ and $R^2$ are as formerly defined and a diamine (E) in a molar ratio of 2:1 can be used as well. By the action of the catalyst a N,N'-bis(silyl)diamine (F) is formed as an intermediate, whereafter the reaction proceeds further according to the scheme (b) set forth above.

Numerous silanes (G) or dichlorosilanes from which the former can be prepared by reduction are known in the prior art.

The simplest representatives are $SiH_4$, $SiFH_3$, $SiF_2H_2$  and the organically substituted derivatives. On principle, any silane having at least two hydrogen atoms bound to the silicon atom can be used.

On practicing the process, a silane (G) and a diamine in a molar ratio of about 2:1 are brought to reaction in an inert solvent in the presence of a catalytic amount of a metal, or metal hydride respectively, until no more hydrogen evolution can be observed, or no more silicon-hydrogen bonds can be detected in the infrared spectrum. Alkali metals and, depending on the circumstances, also aluminum can be used when they are dissolved by the reaction mixture, i.e., so far as the hydrogen being on the nitrogen of the silylated amino group possesses a sufficient acidic character. At the beginning of the reaction, the corresponding hydride will be formed in any case. It was found that the quality (temperature resistance) sometimes is improved when an excess amount of the silane (G) is used, thereby the appearance of amino groups (primary and secondary amino groups) as terminal groups in the polymers will be avoided.

The reaction is expediently started by adding a hydride. Suitable hydrides are e.g. NaH, KH, LiH, $BaH_2$, $CaH_2$, $AlH_3$, moreover complex hydrides such as e.g. $NaBH_4$, $KBH_4$, $LiBH_4$, $NaAlH_4$, $KAlH_4$, $LiAlH_4$, and $Mg(AlH_4)_2$. In general, 0.1 to 10 mole-percent of catalyst based on the diamine (E) or the intermediate N,N'-bis(silyl)diamine (F) respectively, are sufficient for the reaction if the catalyst will not be consumed in a hydrogenolytic side reaction. Hydroxyl and mercapto groups are expediently reacted previously with alkali metal. The conversion into the corresponding salts can be also achieved by a stoichiometric amount of hydride.

Not all catalysts possess the same activity. It was found that the reaction velocity decreases, for example, in the range of the metals K>Na>Li. The same is true of their hydrides. The reaction speed also depends on the solvent. Whereas, the activity of e.g. potassium or potassium hydride in di-n-butyl-ether or hexane is not greatly different, the lithium or lithium hydride in these solvents shows even at 140° C. practically no activity. However, lithium or lithium hydride are suitable catalysts in tetrahydrofuran or dioxane. The reaction can be further promoted by the supplementary presence of strong tertiary amines like trimethylamine, triethylamine, N,N'-diethylpiperazine, etc., or cobalt chloride or colloid metals like cobalt, nickel and copper. In principle, the intermediary step of the reaction of invention is a kind of dehydrogenation. But other well known dehydrogenation catalysts show no advantages over those proposed herein.

It is well known that the hydrides mentioned herein are less or more strong reducing agents and can also provoke hydrogenolytic cleavages. Some of the previously enumerated substituents which can arise in the starting compounds would normally be reduced. By appropriately selecting the hydride and solvent, substituents otherwise reducible will be preserved in the end-products. It is well known that, for example, compounds having the grouping Si—O—C, Si—O—Si, Si—X, B—O—C, B—O—B, B—X, P—O—C, P—O—P or P—X (X=Cl, F) are converted into the corresponding reduction products (silanes, borines or phosphines respectively, plus salts of the hydroxyl constituent cleaved) by, e.g. lithium-aluminum hydride only in a donor solvent like ether, but not in e.g. hexane. Since the process of invention can be conducted also in solvents having no donor properties and thereto can be used hydrides like LiH, NaH and KH displaying much less reducing power under the conditions employed, reducible substituents such as enumerated above are possible. Thus, the kind of hydride plays an important role. While, e.g. aromatic ketones, aliphatic halides, aromatic halides, acid anhydrides, esters, amides, imides, acetals, aliphatic nitriles, aromatic nitriles, aromatic nitro compounds and certain double bonds will be reduced by lithium-aluminum hydride on heating in ether, no reduction will occur under the relatively mild conditions employed according to the invention with potassium hydride, being more appropriate than lithiumaluminum hydride. The qualification of a defined hydride is ascertained in a preliminary experiment.

The reaction speed further depends on the temperature. In general, temperatures of between about 20 and 150° C. are sufficient. If necessary, however, also higher reaction temperatures can be employed. The upper temperature limit is defined by the decomposition point of the cyclodisilazane. This decomposition point is high and lies above 400° C. in most cases.

As a rule, a stoichiometric amount of hydrogen escapes during the reaction. But one can also use the evolving hydrogen for the hydrogenation of an unsaturated position, or reducible position respectively. These positions, able to take up hydrogen, can be present in the reactants as well as in the solvents.

As a rule, the reaction is carried out in an inert solvent. Suitable solvents are, e.g. straight-chain and branched-chain paraffins having up to about 10 carbon atoms in the molecule like propane, n-butane, n-pentane, iso-pentane, n-hexane, iso-hexane, 2,4,4-trimethylpentane, n-octane, iso-octane, n-decane, etc.; cycloparaffins like cyclohexane, methylcyclohexane, cyclopentene, cyclohexene, cyclohexadiene, etc.; aromatic hydrocarbons like benzene, toluene, xylene, ethylbenzene, mono- and dialkylnaphthalenes, e.g. 1-methylnaphthalene, 1,4-dimethylnaphthalene, 1-ethylnaphthalene, 2-ethylnaphthalene; hydroaromatic hydrocarbons like tetralin, decalin, etc.; moreover chlorinated and fluorinated derivatives of the above-mentioned hydrocarbons; moreover aliphatic ether like methylethylether, ethylether, iso-propylether, n-propylether, allylether, ethyl-n-butylether, n-butylether, iso-butylether, benzymethylether, ethyleneglycoldimethylether, ethyleneglycoldiethylether, diethyleneglycoldimethylether, etc.; aromatic ether like anisol, phenetol, veratrol, phenylether, phenyl-allylether, phenyl-benzylether, etc.; cyclic ether like furan, tetrahydrofuran, tetrahydrofurfurylethylether, dioxane, etc. Moreover, some qualified solvents are acetonitrile, benzonitrile, acetone, diethylketone, dimethylsulfone, dimethylsulfoxide, tetramethylenesulfoxide, dimethylformamide, dimethylacetamide, ethylacetate, N-ethylmorpholine, pyridine, N,N'-dialkylpiperazines, tetramethylurea, etc. The choice of the appropriate solvent is directed by the solubility of the catalyst and the reducing power. When the reactants and the endproduct are soluble at the reaction temperature, the process can be conducted also without a solvent.

It depends on the organic group $R^3$ which of the compounds (A) or (A') will be formed in the pyrrolytic process (a) as well as in the catalytic process (b). When $R^3$ is such an organic group which does not allow a ring closure via the two nitrogen atoms which it contains, the compound (A) will be formed. Such organic groups are e.g. alkylene groups having the two nitrogen atoms more distant than 3 carbon atoms like in, e.g. the intermediary starting compounds 1,4-diaminabutane and 1,6-diaminohexane, or arylene groups having the two nitrogen atoms in meta or para-position like in, e.g. 1,3-diaminobenzene and 1,4-diaminobenzene. On the other hand, using, e.g. 1,2-diaminoethane, 1,3-diaminopropane, 1-2-diaminobenzene, or the N,N'-disubstituted derivatives, respectively, the resulting endproducts will have the structure (A') shown at the beginning of this specification. Such polymers are embodied in the Examples 7, 12, and 17.

The polymers are more resistant if they are freed of the catalyst. The hydrides can be eliminated by washing with methanol. When the polymers are soluble, they can be extracted with a suitable solvent in order to achieve the purification. Depending on the circumstances, the purification can be also achieved by washing with water or dissolving in water and reprecipitation.

The molecular weight of the polymers can be varied in usual manner by addition of chain-terminating agents. Monohydrosilanes of the formula $R^1_3SiH$, wherein $R^1$ has the previous significance, are especially suited.

The polymers are liquid, waxy, glassy, glutinous or rubber-like and may be fiber-forming according to the organic radicals $R^1$, $R^2$ and $R^3$. If they contain carboxylic, sulfo or other acid groups they can be soluble in water in the form of their alkali salts and become insoluble on acidifying. They can also be more or less cross-linked and insoluble in any solvent. They are resistant at temperature up to 500° C. and more and may even be useful at temperatures up to 1000° C. Many of the polymers can be processed by the usual thermoplastic methods, such as extrusion, injection molding, blown, calendered and extruded film and some other by conventional rubber molding techniques such as compression and transfer mold. The hard types of polymeric cyclodisilazanes are casting resins which are workable by using cutting machines, or the polymerization has to be carried out during the fabrication. The foamed polymers can be prepared in known manner by addition of blowing agents like azo-bis-isobutyronitrile, dinitrosohexamethylenetetraamine, etc. The amine or hydrogen which is split off in the reaction can also act as a blowing agent. Especially suited are methylamine and ethylamine.

A further object of this invention is the use of the polymeric cyclodisilazanes in the preparation of coatings, films, impregnations, etc. For this purpose the mixture of the starting reactants, i.e. the diaminosilane plus diamine, or the intermediate N,N'-bis(aminosilyl)diamine, or the silane plus diamine plus catalyst, or the N,N'-disilyldiamine plus catalyst is applied to a substratum and subjected to such temperatures, as the formation of higher polymerized, possibly cross-linked synthetic composition coatings is achieved Or the polymer is applied in a solvent such as hexane, benzene, tetrahydrofuran, acetone, ether, methanol, ethanol, etc. After evaporation of the solvent, the polymer possibly can be baked on their support. The polymers are excellently suited for lacquers and impregnations of substrates such as paper, textiles, leather, plastics, wood, glass, metals, rubber, etc. The polymers can contain as additives other constituents such as powdered wood, asbestos, glass fibers, metal fibers, pigments, etc., thereby their mechanical properties will be modified.

EXAMPLE 1

A mixture of 9.21 g. (0.05 mol) benzidine and 27.04 g. (0.1 mol) bis(ethylamino)diphenylsilane is heated in a flask provided with a thermometer reachng into the melt, and with a reflux condenser. At a temperature of about 190° a significant evolution of ethylamine begins. In the course of 21 hours the temperature is raised to 400° C. The escaping ethylamine is collected in 1 N HCl and estimated by titration. From this the conversion is calculated, as it also is in the following examples. The flask content thickens gradually but is still liquid at 60% conversion (270° C.). From 70% conversion the mixture is solid and at 400° C. (final temperature) can no longer be melted. Based on the amount of ethylamine split off, the conversion amounts to 96.7% of the theoretical value.

An impurity is removed by extracting the obtained mass with hexane for 15 hours. Yield 26.2 g. (96.4%).

The polymer obtained is a hard, not too brittle mass of light yellow color. It is insoluble in the usual organic solvents and in water, even after prolonged boiling.

Analysis.—$C_{36}H_{28}N_2Si_2$ (544.8 per unit). Calc'd (percent): C, 79.37; H, 5.18; N, 5.14. Found (percent): C, 77.21; H, 5.02; N, 5.88.

The same starting mixture is heated at 180 to 370° C. within 45 hours using, however, 160 g. of terphenyl as solvent. The resulting mass is extracted with cyclohexane for 53 hours to remove some impurities.

EXAMPLE 2 g. (0.05 mol) bis(ethylamino)dimethylsilane is heated as in Example 1. At a temperature of about 134° C. a significant evolution of ethylamine begins. The temperature of the mixture is increased to 390° C. in the course of 15 hours. The flask content is still fluid at 75% conversion (280° C.) and then thickens quickly and at 390° C. (final temperature) it can no longer be melted. Based on the amount of ethylamine split off, the conversion is 95.2% of the theoretical value. An impurity is removed by extracting the obtained mass with hexane for 15 hours.

A mixture of 4.60 g. (0.025 mol) benzidine and 7.32 Yield 7.01 g. (94.6%). The polymer obtained is a transparent, bright yellow, viscous mass and has no M.P.

Analysis.—$C_{16}H_{20}N_2Si_2$ (296.5 per unit). Calc'd (percent): C, 64.81; H, 6.80; N, 9.45. Found (percent): C, 64.46; H, 6.90; N, 10.54.

EXAMPLE 3

A mixture of 12.0 g. (0.06 mol) 3,3'-diaminodiphenyl ether and 24.25 g. (0.12 mol) bis(n-butylamino)dimethylsilane is heated as in Example 1. At a temperature of about 110° C. a significant evolution of n-butylamine begins. Because the reaction partners are not very soluble, the mixture is stirred to a conversion of 45% (180° C.). The temperature of the mixture is increased in the course of 9 hours to 400° C. The flask content is liquid at a conversion of 75–84% (320° C.) and highly viscous in the cold. The clear, bright yellow melt begins to foam at 370–400° C. and then hardens to a gummy mass. According to the amount of butylamine split off, the conversion amounts to 91% of the theoretical value.

The polymer obtained is a brown, thermoplastic mass. It can be freed of a small amount of glutinous substance by extraction, e.g. with methyl chloride. The polymer swells under the influence of many organic solvents. An impurity is removed by extracting the obtained mass with hexane for 15 hours. Yield 16.7 g. (90.8%).

Analysis.—$C_{16}H_{20}ON_2Si_2$ (312.5 per unit). Calc'd (percent): C, 61.49; H, 6.45; N, 8.96. Found (percent): C, 61.10; H, 6.31; N, 9.19.

EXAMPLE 4

A mixture of 29.2 g. (0.1 mol) bis(1,3-aminophenoxy)-phenylene-(1,3) and 29.2 g. (0.2 mol) bis(ethylamino)-dimethylsilane is heated as in Example 1. At a temperature of about 128° C. a significant evolution of ethylamine begins. The temperature is increased to 400° C. during the course of 7 hours. The mixture is stirred as long as it is possible. It is still liquid at a conversion of about 50% (300° C.), becomes more and more viscous at a conversion range up to 80% and then finally at 400° C. (final temperature) solidifies to a gummy mass. Based on the amount of ethylamine split off, the conversion is 96.8% of the theoretical value. An impurity is removed by extracting the obtained mass with methylchloride for 40 hours. Yield 95.3%.

The polymer obtained is a brown, thermoplastic mass. It swells under the influence of many organic solvents.

Analysis.—$C_{22}H_{24}O_2N_2Si_2$ (404.6 per unit). Calc'd (percent): C, 65.30; H, 5.98; N, 6.92. Found (percent): C, 65.05; H, 5.73; N, 7.38.

The same product is obtained when bis(n-butylamino)dimethylsilane is used instead of bis(ethylamino)dimethylsilane.

EXAMPLE 5

1.84 g. (0.01 mol) of benzidine and 3.68 g. (0.02 mol) of diphenylsilane are dissolved in 30 ml. of pure dimethoxyethane and 0.104 g. (0.0043 mol) of sodium hydride is added at 22° C., whereupon a vigorous evolution of hydrogen occurs. After about 3 hours 80–90% of the theoretical amount of hydrogen is split off. The mixture is kept for some time at the boiling point of the solvent (86° C.) until no more substantial amount of hydrogen escapes.

The yellowish polymer is filtered off, washed first with hexane and then with methylalcohol and dried at 80° C. Yield 4.96 g. (91.0%).

Analysis.—$C_{36}H_{28}N_2Si_2$ (544.8 per unit). Calc'd (percent): C, 79.37; H, 5.18; N, 5.14; Si, 10.31. Found (percent): C, 77.21; H, 5.02; N, 5.88; Si, 9.58.

The polymer is insoluble in the common organic solvents. The same mixture is heated at 50 to 140° C. in 5 hours, using 60 ml. of xylene instead of 1,2-dimethoxyethane. The xylene is distilled off and the residue is treated with cold methyl alcohol for 3 hours and then extracted with hexane to remove further impurities. Yield 5.4 g. (98.5%).

EXAMPLE 6

A mixture of 1.08 g. (0.01 mol) p-phenylenediamine 3.68 g. (0.02 mol) diphenylsilane and 0.063 g. (0.0026 mol) sodium hydride in 30 ml. dimethoxyethane is heated from 22 to 81° C. in 4 hours. The hydrogen recovered corresponds to 98% conversion. The product is precipitated with hexane, washed with methanol and dried in vacuo at 80° C. Yield 4.51 g. (96.2%). The polymer is a slightly yellowish powder, insoluble in the common organic solvents.

*Analysis.*—$C_{30}H_{24}N_2Si_2$ (468.7 per unit). Calc'd (percent): C, 76.88; H, 5.16; N, 5.98. Found (percent): C, 76.90; H, 5.13; N, 5.69.

EXAMPLE 7

1.202 g. (0.02 mol) of ethylenediamine, 7.373 g. (0.04 mol) of diphenylsilane and 5–10 mg. of sodium hydride are reacted in 20 ml. of dimethoxyethane. A vigorous evolution of hydrogen occurs at 30° C. The reaction temperature is increased to 85° C. in 3 to 4 hours. The solvent is distilled off at 50° C./0.01 mm. The remaining viscous and somewhat glutinous polymer is stirred with hexane and filtered off. Yield 8.08 g. (96.0%). The polymer is treated with methylalcohol at room temperature for one hour and dried at 50° C./0.01 mm. The polymer gives a clear melt at about 120° C. It is soluble in benzene and ether.

*Analysis.*—$C_{26}H_{24}N_2Si_2$ (420.67 per unit). Calc'd (percent): C, 74.23; H, 5.75; N, 6.66; Si, 13.35. Found (percent): C, 73.62; H, 5.89; N, 7.02; Si, 12.00.

The polymer displays the same properties when it is prepared in benzene instead of dimethoxyethane. The polymer contains 1,3-diaza-2-sila-cyclopentane ring units whose nitrogen atoms are linked via silyl groups to form the polymer.

EXAMPLE 8

1.76 g. (0.02 mol) of 1,4-diaminobutane, 7.37 g. (0.04 mol) of diphenylsilane and 5–10 mg. of sodium hydride are reacted in 20 ml. of dimethoxyethane at 86° C. for 5 to 6 hours. The mixture is worked up as in the foregoing example. Yield 8.21 g. (91.5%). The polymer softens at about 61° C. and gives a clear melt at about 90° C. It is a mobile liquid at 200° C. It is soluble in benzene and ether.

*Analysis.*—$C_{28}H_{28}N_2Si_2$ (448.73 per unit). Calc'd (percent): C, 74.95; H, 6.29; N, 6.24; Si, 12.52. Found (percent): C, 72.75; H, 6.26; N, 5.85; Si, 10.42.

There is also obtained 0.78 g. of a liquid polymer which is soluble in hexane.

EXAMPLE 9

2.32 g. (0.02 mol) of 1,6-diaminohexane, 7.37 g. (0.04 mol) of diphenylsilane and 5–10 mg. of sodium hydride are reacted in 20 ml. of dimethoxyethane at 84–86° C. for 5 to 6 hours. The solvent is distilled off. The hard residue is pulverized, treated with methylalcohol, and extracted with hexane for one hour. Yield 0.58 g. soluble in hexane. 9.0 g. (94.4%) insoluble in hexane. The polymer gives a clear melt at about 150° C.

*Analysis.*—$C_{30}H_{32}N_2Si_2$ (476.78 per unit). Calc'd (percent): C, 75.57; H, 6.77; N, 5.88. Found (percent): C, 74.83; H, 6.70; N, 5.93.

EXAMPLE 10

3.96 g. (0.02 mol) of 4,4'-diaminodiphenylmethane, 7.37 g. (0.04 mol) of diphenylsilane and 5 to 20 mg. of sodium hydride are reacted in 20 ml. of xylene at 100–140° C. for 4 to 6 hours. The mixture is stirred with hexane and the polymer precipitates together with the sodium hydride and filtered off. The polymer is then treated with ethylalcohol at 25° C. for 2 hours, filtered off and dried at 100° C./0.01 mm. Yield 9.98 g. (89.3%).

*Analysis.*—$C_{37}H_{30}N_2Si_2$ (558.84 per unit). Calc'd (percent): C, 79.52; H, 5.41; N, 5.01. Found (percent): C, 79.31; H, 5.49; N, 4.66.

EXAMPLE 11

4.00 g. (0.02 mol) of 4,4'-diaminodiphenylether, 7.37 g. (0.04 mol) of diphenylsilane and 5 to 20 mg. of sodium hydride are reacted in 40 ml. of xylene at 140° C. for 16 hours. The sodium hydride is filtered off, the polymer precipitated by hexane and extracted with hexane for several hours. Yield 10.9 g. (97.2%). The brown polymer is thermoplastic.

*Analysis.*—$C_{36}H_{28}N_2Si_2O$ (560.8 per unit). Calc'd (percent): C, 77.10; H, 5.03; N, 4.99. Found (percent): C, 77.23; H, 5.17; N, 4.72.

When potassium hydride is used instead of sodium hydride, the reaction proceeds much faster.

EXAMPLE 12

2.16 g. (0.02 mol) of 1,2-diaminobenzene, 4.32 g. (0.04 mol) of phenylsilane and 5 to 20 mg. of sodium hydride in 50 ml. mesitylene are reacted in 50 ml. mesitylene at 158° C. for 15 hours. The sodium hydride is removed. After having distilled off the solvent, the residue is extracted with hexane for 15 hours to remove impurities. Yield 6.1 g. (95.9%).

*Analysis.*—$C_{18}H_{16}N_2Si_2$ (316.5 per unit). Calc'd (percent): C, 68.30; H, 5.10; N, 8.85. Found (percent): C, 67.91; H, 5.15; N, 9.47.

EXAMPLE 13

3.68 g. (0.02 mol) of benzidine, 4.32 g. (0.04 mol) of phenylsilane and 5 to 20 mg. of sodium hydride are reacted in 40 ml. mesitylene for 8 hours and worked up as in Example 12. Yield 7.5 g. (95.1%).

*Analysis.*—$C_{24}H_{20}N_2Si_2$ (392.6 per unit). Calc'd (percent): C, 73.42; H, 5.13; N, 7.14. Found (percent): C, 71.29; H, 4.86; N, 7.49.

EXAMPLE 14

3.96 g. (0.02 mol) of 4,4'-diaminodiphenylmethane, 4.32 g. (0.04 mol) of phenylsilane and 5 to 20 mg. of sodium hydride are brought to reaction in 40 ml. of 1-phenyldodecane at 240° C. for 5 hours. The sodium hydride is filtered off, the solvent evaporated and the residue extracted with hexane for 15 hours to remove impurities. Yield 8.0 g. (98.8%).

*Analysis.*—$C_{25}H_{22}N_2Si_2$ (406.6 per unit). Calc'd (percent): C, 73.84; H, 5.45; N, 6.89. Found (percent): C, 71.49; H, 5.25; N, 7.12.

EXAMPLE 15

3.68 g. (0.02 mol) of 4,4'-diaminodiphenyl, 4.88 g. (0.04 mol) of methyl-phenylsilane and 5 to 20 mg. of sodium hydride are reacted in 20 ml. of 1,2-dimethoxyethane at 80° C. for 3 hours. The reaction product is worked up as in Example 14. Yield 8.1 g. (96.3%).

*Analysis.*—$C_{26}H_{24}N_2Si_2$ (420.7 per unit). Calc'd (percent): C, 74.23; H, 5.75; N, 6.66. Found (percent): C, 73.94; H, 5.71; N, 6.77.

EXAMPLE 16

3.96 g. (0.02 mol) of 4,4'-diaminodiphenylmethane, 4.88 g. (0.04 mol) of methyl-phenylsilane and 5 to 20 mg. of sodium hydride are reacted in 40 ml. of xylene at 140° C. for 11 hours. The sodium hydride is filtered off, the polymer precipitaated by hexane, separated and extracted with hexane for several hours. Yield 8.5 g. (98.2%).

*Analysis.*—$C_{27}H_{26}N_2Si_2$ (434.7 per unit). Calc'd (percent): C, 74.60; H, 6.03; N, 6.44. Found (percent): C, 74.26; H, 5.91; N, 6.48.

EXAMPLE 17

0.74 g. (0.01 mol) of 1,3-diaminopropane, 3.68 g. (0.02 mol) of diphenylsilane and 0.06 g. (0.0025 mol) of sodium hydride are heated in 40 ml. of 1,2-dimethoxyethane at 30 to 80° C. in 5 hours. The mixture is worked up as in Example 7. Yield 4.0 g. (92.8%).

The polymer contains 1,3-diaza-2-silacyclohexane ring units, whose nitrogen atoms are linked via silyl groups to form the polymer.

*Analysis.*—$C_{27}H_{26}N_2Si_2$ (434.7 per unit). Calc'd (percent): C, 74.70; H, 6.03; N, 6.44; Si, 12.92. Found (percent): C, 74.34; H, 6.41; N, 6.76; Si, 12.18.

Softening points of the polymers

The softening points are defined by the temperature at which a metal rod, pressed at 2.3 kg./cm.², enters a compact piece of polymer (5 mm. high) ⅗ of its depth. A constant rate of heating of 2° C. per minute was applied.

| Polymer of example: | Softening point, ° C. ±3° |
|---|---|
| 2 | 133 |
| 5 | >315 |
| 6 | >328 |
| 7 | 83 |
| 8 | 61 |
| 9 | ~24 |
| 10 | 212 |
| 11 | 68 |
| 12 | >315 |
| 13 | >315 |
| 14 | >315 |
| 15 | 117 |
| 16 | 83 |
| 17 | ~24 |

The product of Example 1 is similar to that of Example 5. The polymers of Examples 3 and 4 are glutinous.

THERMOGRAVIMETRIC ANALYSES—WEIGHT RESIDUE PERCENT
[Heating rate, 2.8° C./min.; atmosphere, nitrogen]

| Polymer of example | 200° | 250° | 300° | 350° | 400° | 450° | 500° | 550° | 600° | 650° | 700° | 750° | 800° | 850° | 900° |
|---|---|---|---|---|---|---|---|---|---|---|---|---|---|---|---|
| 2 | 100 | 100 | 100 | 99 | 95 | 84 | 62.5 | 56.5 | 55 | 54.5 | 54 | 53.5 | 53 | 52.5 | 52.5 |
| 5 | 100 | 100 | 100 | 100 | 87 | 75 | 66.5 | 58.5 | 52.5 | 47 | 44.5 | 43 | 42 | 41.5 | 41 |
| 6 | 100 | 100 | 100 | 97 | 92 | 84.5 | 75 | 63 | 55 | 51.5 | 49.5 | 48.5 | 47.5 | 47 | 46.5 |
| 7 | 100 | 99 | 97 | 94.5 | 90 | 83 | 77 | 52 | 48 | 46.5 | 46 | 45.5 | 45.5 | 45 | 45 |
| 8 | 100 | 100 | 97 | 93 | 87 | 77 | 52.5 | 42 | 38.5 | 37 | 36.5 | 36.5 | 36.5 | 36.5 | 36.5 |
| 9 | 100 | 98.5 | 93.5 | 97.5 | 82.5 | 73 | 43 | 35 | 31.5 | 30 | 29.5 | 29 | 29 | 28.5 | 28 |
| 10 | 100 | 100 | 100 | 98 | 93 | 85 | 79 | 73.5 | 69.5 | 67 | 65.5 | 65.5 | 65.5 | 65.5 | 65.5 |
| 11 | 100 | 100 | 98.5 | 95.5 | 90 | 82.5 | 72.5 | 60 | 50.5 | 46.5 | 45 | 45 | 45 | 45 | 44.5 |
| 13 | 100 | 100 | 100 | 100 | 97.5 | 92.5 | 84.5 | 76.5 | 72.5 | 70 | 69 | 69 | 69 | 69 | 69 |
| 14 | 100 | 100 | 100 | 98.5 | 95.5 | 89 | 82 | 75 | 70 | 68.5 | 67.5 | 67 | 67 | 67 | 67 |
| 15 | 100 | 100 | 100 | 97.5 | 92.5 | 82.5 | 72.5 | 65.5 | 62.5 | 61 | 61 | 61 | 61 | 61 | 61 |

What is claimed is:

1. A polymeric cyclosilazane of the formula

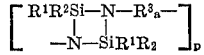

wherein $R^1$ and $R^2$ taken singly are each hydrogen atoms, fluorine atoms or hydrocarbyl groups which can have halogen atoms, alkoxy groups, aroxy groups and silyl groups as substituents, $R^1$ and $R^2$ taken together with the silicon atom to which they are attached form a heterocyclic group, $R^3$ is a hydrocarbylene group or a hydrocarbylene ether group which can have halogen atoms, alkoxy groups, aroxy groups and silyl groups as substituents, $a$ is 0 or 1, and $p$ represents the number of repeating units, provided $R^3$ is such a group that does not allow ring closure and $R^3$ separates the nitrogen atoms by more than 3 aliphatic carbon atoms or meta or para spaced nitrogen atoms on an aromatic ring.

2. A polymeric cyclosilazane of claim 1 wherein $R^1$ and $R^2$ are each hydrocarbyl having not more than 8 carbon atoms, $R^3$ is hydrocarbylene having not more than 24 carbon atoms, and $a$ is 1.

3. A polymeric cyclosilazane of claim 1 wherein $R^1$ and $R^2$ are hydrocarbyl having not more than 8 carbon atoms, $R^3$ is a hydrocarbylene ether having not more than 24 carbon atoms and $a$ is 1.

4. A polymeric cyclodisilazane of claim 1 of the formula

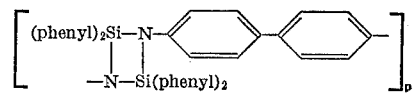

5. A polymeric cyclodisilazane of claim 1 of the formula

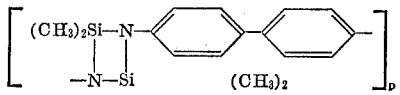

6. A polymeric cyclodisilazane of claim 1 of the formula

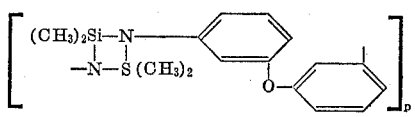

7. A polymeric cyclodisilazane of claim 1 of the formula

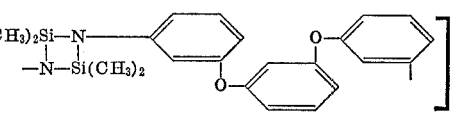

8. A polymeric cyclodisilazane of claim 1 of the formula

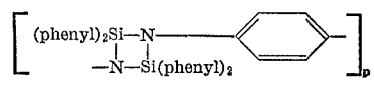

9. A polymeric cyclodisilazane of claim 1 of the formula

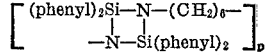

10. A polymeric cyclodisilazane of claim 1 of the formula

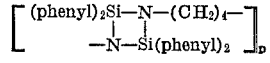

11. A polymeric cyclodisilazane of claim 1 of the formula

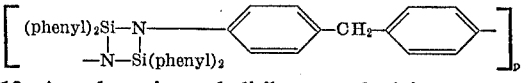

12. A polymeric cyclodisilazane of claim 1 of the formula

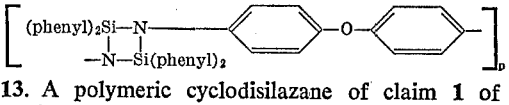

13. A polymeric cyclodisilazane of claim 1 of the formula

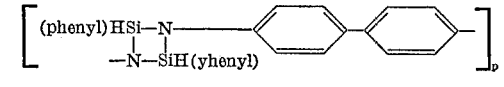

14. A polymeric cyclodisilazane of claim 1 of the formula

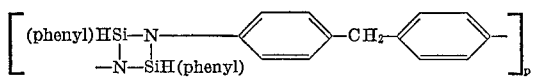

15. A polymeric cyclodisilazane of claim 1 of the formula

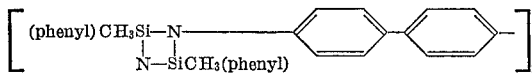

16. A polymeric cyclodisilazane of claim 1 of the formula

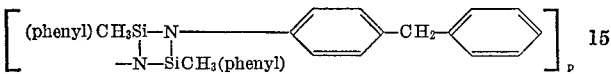

17. A diaminodiorganosilane of the formula

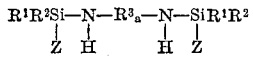

wherein $R^1$, $R^2$, $R^3$ and $a$ are as defined in claim 1 and Z is a hydrogen atom or a cleavable amine group.

18. A process for the preparation of the polymeric cyclosilazanes of claim 1, comprising heating a diaminodiorganosilane of the formula

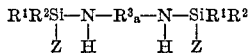

wherein $R^1$, $R^2$, $R^3$ and $a$ are as defined in claim 1 and Z is a cleavable amine group, volatile at reaction temperature, at a temperature gradually increasing toward the decomposition point of the polymeric cyclosilazane until no significant amount of amine is split off.

19. A process of claim 18 wherein said diaminodiorganosilane is made in situ by heating a diaminodiorganosilane of the formula $SiR^1R^2Z_2$ wherein $R^1$, $R^2$ and Z are as defined in claim 18, with a diamine of the formula $H_2NR^3{}_aNH_2$ wherein $R^3$ and $a$ are as defined in claim 18, in a molar proportion of at least about 2:1, at a temperature gradually increasing toward the decomposition point of the polymeric cyclosilazane until no significant amount of amine is split off.

20. A process for the preparation of a polymeric cyclosilazane of claim 2 comprising heating a diaminodiorganosilane of the formula $SiR^1R^2Z_2$ wherein $R^1$ and $R^2$ are as defined in claim 2 and Z is a cleavable amine group volatile at reaction temperature, with a diamine of the formula $H_2NR^3NH_2$ wherein $R^3$ is as defined in claim 2, in a molar proportion of at least about 2:1, at a temperature gradually increasing toward the decomposition point of the polymeric cyclosilazane until no significant amount of amine is split off.

21. A process for the preparation of a polymeric cyclosilazane of claim 3 comprising heating a diaminodiorganosilane of the formula $SiR^1R^2Z_2$ wherein $R^1$ and $R^2$ are as defined in claim 3 and Z is a cleavable amine group volatile at reaction temperature, with a diamine of the formula $H_2NR^3NH_2$ wherein $R^3$ is as defined in claim 3, in a molar proportion of at least about 2:1, at a temperature gradually increasing toward the decomposition point of the polymeric cyclosilazane until no significant amount of amine is split off.

22. A process for the preparation of the polymeric cyclosilazanes of claim 1, comprising treating at a temperature at least sufficient to split off hydrogen a silazane of the formula

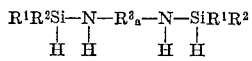

wherein $R^1$, $R^2$, $R^3$ and $a$ are as defined in claim 1, in an inert solvent with at least a catalytic amount of potassium, sodium or lithium, or hydride thereof.

23. A process of claim 22 wherein said silazane is made in situ by treating a silane of the formula $R^1R^2SiH_2$ wherein $R^1$ and $R^2$ are as defined in claim 22, with a diamine of the formula $H_2N-R^3{}_a-NH_2$ wherein $R^3$ is as defined in claim 22, in a molar proportion of at least 2:1 silane to diamine, in an inert solvent with at least a catalytic amount of potassium, sodium or lithium, or hydride thereof, at a temperature in the range of about 20 to 150° C.

24. A process of claim 23 wherein said solvent is an ether.

References Cited

UNITED STATES PATENTS

| | | | |
|---|---|---|---|
| 3,172,874 | 3/1965 | Klebe | 260—2 |
| 3,207,707 | 9/1965 | Klebe | 260—448.2 |
| 3,228,895 | 1/1966 | Burks et al. | 260—2 |
| 3,297,592 | 1/1967 | Fink | 260—2 |
| 3,311,571 | 3/1967 | Burks et al. | 260—2 |
| 3,354,098 | 11/1967 | Byrd | 260—2 |

FOREIGN PATENTS 1,425,306  12/1965  France.

OTHER REFERENCES

Fink: "Silicon-Nitrogen Heterocycles," Angew. Chem. Internat. Edit., vol. 5, 1966, No. 9, pp. 760 to 774.

DONALD E. CZAJA, Primary Examiner.

M. I. MARQUIS, Assistant Examiner.

U.S. Cl. X.R.

117—124, 135.1, 139, 143, 148, 152, 161; 260—30.4, 32.8, 33.2 33.4, 33.6, 37, 46.5, 47, 79, 79.3, 448.2